United States Patent
McCreary et al.

[15] 3,636,923
[45] Jan. 25, 1972

[54] APPARATUS FOR COATING MICROSPHERES WITH PYROLYTIC CARBON

[72] Inventors: William J. McCreary; Donald B. Court, both of Los Alamos, N. Mex.

[73] Assignee: The United States of America as represented by the United States Atomic Energy Commission

[22] Filed: Mar. 4, 1970

[21] Appl. No.: 16,507

[52] U.S. Cl. ...................... 118/400, 23/288 S, 176/67, 264/21, 117/46, 118/429
[51] Int. Cl. .......................................................... B01j 9/00
[58] Field of Search .......... 117/46 CA, 46 CB, 46 CG, 100 B, 117/DIG. 6; 118/400, 76, 303; 23/288 S

[56] References Cited

UNITED STATES PATENTS

| | | |
|---|---|---|
| 3,249,509 | 5/1966 | Blocher, Jr. ..............................176/67 |
| 3,382,093 | 5/1968 | Nack .......................................117/100 |
| 3,549,847 | 12/1970 | Clark et al. ..........................219/10.49 |
| 2,990,260 | 6/1961 | Mungen....................................23/288 |
| 3,166,614 | 1/1965 | Taylor .....................................264/21 |

Primary Examiner—Mervin Stein
Assistant Examiner—Leo Millstein
Attorney—Roland A. Anderson

[57] ABSTRACT

A fluidized bed coater capable of depositing uniform coatings of high-density, oriented pyrolytic carbon having a smooth microstructure on a charge of particles having an initial surface area of 44,000 cm.$^2$. The deposition is accomplished from an atmosphere containing methane and an inert gas at a temperature of about 1,200° C.

2 Claims, 2 Drawing Figures

PATENTED JAN 25 1972

INVENTOR.
William J. McCreary
BY   Donald B. Court

APPARATUS FOR COATING MICROSPHERES WITH PYROLYTIC CARBON

The invention described herein was made in the course of, or under, a contract with the U.S. Atomic Energy Commission. It relates generally to gas-solid contactors and more particularly to an improved fluidized bed coater for use in depositing pyrolytic carbon coatings on nuclear fuel particles.

Fluidized bed coaters have been found to be extremely useful devices for depositing desired pyrolytic carbon coatings on nuclear fuel particles. Generally, the coating method consists of suspending the fuel particles in a heated, vertical column, usually 1 to 5 inches in diameter, by the upward flow of an inert gas such as helium or argon. A thermally decomposable gaseous hydrocarbon such as methane, acetylene, or any of a number of hydrocarbons, singly or in mixtures, is then mixed with the inert gas before it enters the heated column, and the products formed by the pyrolysis or cracking of the hydrocarbon gas as it rises through the column coat the fuel particles suspended within the column by the flow of gas.

Depending on the amount and type of gaseous hydrocarbon flowing through the column, the contact time, the surface area of the fluidized bed, and the temperature of the column, various forms of pyrolytic carbon can be coated on nuclear fuel particles. It is possible to control rather closely whether the deposited pyrolytic carbon will be oriented or isotropic, whether it will have a high or low density and whether it will have a rough or a smooth microstructure. By the correct choice of coating parameters and use of an appropriate fluidized bed coater, desirable properties can be quite literally tailored into the pyrolytic carbon coatings.

To be useful for coating nuclear fuel particles, however, a fluidized bed coater must be capable of producing uniform coatings, that is, coatings having a uniform thickness and uniform properties from particle to particle. The reason for this is that it is not now practical to screen out or otherwise separate those particles in a particular coating run which do not conform to the desired criteria.

It has been found that uniform pyrolytic carbon coatings can readily be attained in small fluidized bed coaters such as that disclosed by Bard et al. in 6 Carbon 603 (1968). Further by appropriate choice of coating parameters, coatings of widely varying characteristics can be achieved in fluidized bed coaters of this type. A basic problem with these coaters, however, is that they are too small. Large quantities of fuel particles simply cannot be efficiently coated using them. For example, in the fluidized bed coater disclosed by Bard et al. the charge of uranium dicarbide fuel particles, 104 to 147 microns in size, usually has an initial surface area of about 1,100 cm.$^2$ and can contain only about 25 grams of uranium.

It is desirable to produce routinely kilogram quantities of pyrolytic-carbon-coated nuclear fuel particles. Attempts to scale up conventional fluidized bed coaters in size have met with several problems. One difficulty is nonuniform movement of particles within the fluidized bed coating zone. An aspect of this problem is distribution of particles in "dead space" at or near the interface of the vertical fluidized bed with the gas distributor when certain gas flow rates are used. Another difficulty is carryover of fuel particles out of the particle disentrainment zone with certain gas flow rates.

Using scaled-up conventional fluidized bed coaters in attempts to produce a high-density, oriented pyrolytic carbon coating with a smooth microstructure, applicants have found that the coatings generally have a nonsmooth microstructure when deposition rates are high enough to give suitably high densities. This results is attributed to the formation of soot particles in the coating zone and the incorporation of such particles into the pyrolytic carbon coating. As used within this application, soot means a soft, loose agglomerate of carbon atoms with amorphous structure. At the relatively low temperatures used (about 1,115° to 1,300° C.), certain higher hydrocarbons formed by the cracking of the hydrocarbon coating gas may also be a part of this soot.

As a result, a scaled-up conventional fluidized bed coater which is capable of producing uniform coatings of low-density, spongy pyrolytic carbon, or low-density, oriented pyrolytic carbon, or perhaps even high-density, isotropic pyrolytic carbon, or high-density, oriented pyrolytic carbon with a rough microstructure, is incapable of providing uniform coatings of high-density, oriented pyrolytic carbon with a smooth microstructure. A high-density, oriented pyrolytic carbon of this type has been found to have utility as a coating on fuel particles used in nuclear reactors.

As used within this application, high-density, oriented pyrolytic carbon with a smooth microstructure has the following properties in an as-deposited condition:

a. Density at least 2.0 g./cm.$^3$ and no more than 2.1 g./cm.$^3$.

b. High preferred orientation such that Bacon anisotropy factor (BAF) is greater than 10.0.

c. Microstructure of polished section smooth in appearance when examined under polarized light (as contrasted to a rought or grainy appearance) or under dark field illumination (no generalized gray appearance characteristics of rough surface under dark field).

It is therefore an object of this invention to provide a gas-solid contactor for fluidizing discrete small diameter particles.

Another object is to provide an improved fluidized bed coater for uniformly coating nuclear fuel particles with pyrolytic carbon.

An additional object is to provide a fluidized bed coater having a novel gas distributor which provides for a more efficient utilization of the gas for fluidizing an coating solid particles, prevents the formation of dead spaces in which particles are not adequately fluidized, and at the same time allows a uniform coating of pyrolytic carbon to be efficiently applied.

Yet another object is to provide an improved fluidized bed coater in which the properties of the pyrolytic carbon coatings deposited can be substantially varied from run to run.

A further object is to provide a fluidized bed coater for coating nuclear fuel particles having a particle size range of 100 to 300 microns at temperatures of 1,150° to 1,300° C.

A still further object is to provide a fluidized bed coater capable in a single run of coating near kilogram quantities of nuclear fuel particles with high-density, oriented pyrolytic carbon having a smooth microstructure.

These and other objects, which will be apparent to those skilled in the art, are accomplished by incorporating into an otherwise conventional fluidized bed coater (1) a baffle system, and (2) a novel gas distributor. The baffle system comprises a central baffle and a wall baffle. The central baffle is centered in the gas exit to the particle disentrainment zone such that gas exiting from this zone must pass through an annulus having an entrance area small in comparison to the area of the exit end of the particle disentrainment zone. Likewise, the wall baffle, located along the wall at the exit end of the main coating chamber reduces the entrance area to the particle disentrainment zone substantially below the area of the exit end of the main coating chamber. The gas distributor comprises a flat apertured faceplate covered with intersecting conical apertures such that no flat surface remains on the faceplate, and means of connecting these conical apertures to a gas supply.

Applicants have found that by incorporating these novel features into a large fluidized bed coater of otherwise conventional design, they are able to confine the fluidized bed such that high flow rates of the coating gas mixture can be used. The reduced contact time of the gas at high flow rates prevents soot particles from forming in the coating and particle disentrainment zones and becoming incorporated into the coating.

The apparatus described herein has been found to be highly suitable for depositing uniform coatings of high-density, oriented pyrolytic carbon having a smooth microstructure on large quantities of nuclear fuel particles. In single runs, quantities of uranium dicarbide particles containing up to 750 grams of uranium can be given uniform coatings of this type of pyrolytic carbon. The average coating rate for this type of carbon can be as high as 3.6 microns per hour; however, if the average coating rate exceeds this value, the microstructure of the carbon being deposited is no longer smooth. The coater is also quite suitable for depositing pyrolytic carbon coatings having substantially different characteristics.

An understanding of this invention will be facilitated by reference to the following detailed description and the accompanying drawings, wherein.

Figure 1:
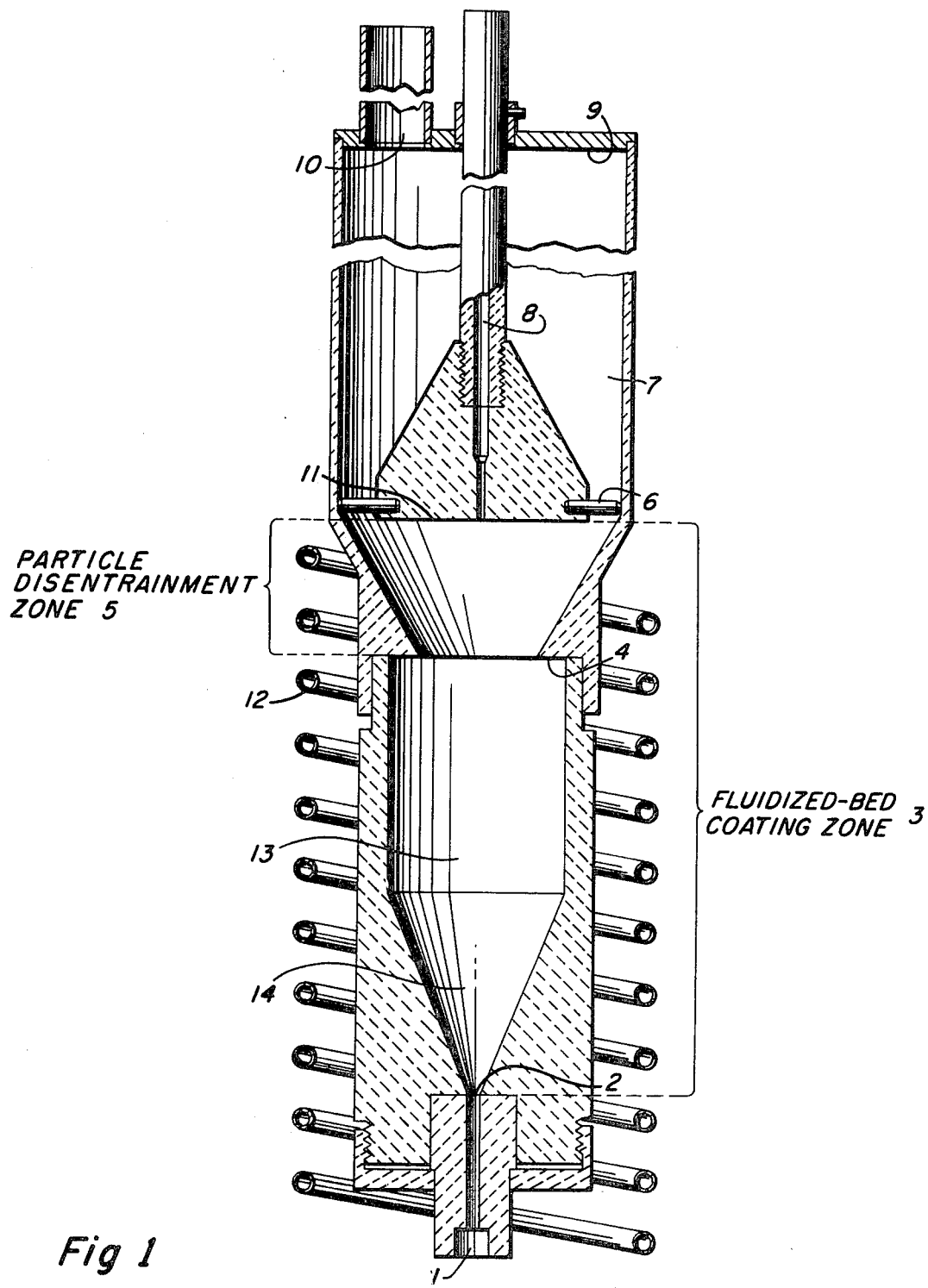
FIG. 1 is a sectional view of a fluidized bed coater incorporation the novel baffle system described herein.

The major components of the fluidized bed coater shown in FIG. 1 are composed of graphite. The hydrocarbon-inert gas mixture enters the coater through a gas inlet 1 and passes through a gas distributor 2 into the fluidized bed coating zone 3. Although the gas distributor 2 may have a single-jet aperture as shown in FIG. 1 or it may have multiple jets or even a diffusion barrier, the preferred gas distributor is that shown in FIG. 2. The main coating chamber 13 is cylindrical and connected to the gas distributor by a tapered section 14, the taper of which can vary from 30° to 45°. The velocity of the gas mixture is sufficiently reduced in the particle disentrainment zone 5 to cause most of the particles being coated to remain below this zone. A tendency at certain flow rates of a small, random amount of particles to rise above 5 is countered by the central baffle 11, held in place by three centering pins 6 at the entrance to chimney 7. With the central baffle in place, the wall baffle 4 serves as a mechanical barrier to particles rising along the walls. Although the particles being coated may strike the surface of the baffles 4 and 11, they do so with insufficient velocity to harm the coatings being deposited on them. A thermocouple well is located within the body of the central baffle 11. Through this well thermocouples may be lowered into the fluidized bed coating zone to determine temperatures within various regions of the zone. The chimney 7 is capped 9 so that the gases (mostly inert gas and hydrogen) coming out of the fluidized bed coating zone pass out of the coater through gas exit 10. The bed particles are heated to the coating temperature by heater 12 which surrounds the fluidized bed coating zone 3 and the gas distributor 2. Heater 12 may be any conventional heater, such as a resistance or induction heater, provided it has sufficient capacity not only to heat the bed particles to a selected coating temperature but also to maintain the fluidized bed coating zone 3 at this temperature with only minimal gradients throughout the zone during the course of the coating operation.

Figure 2:
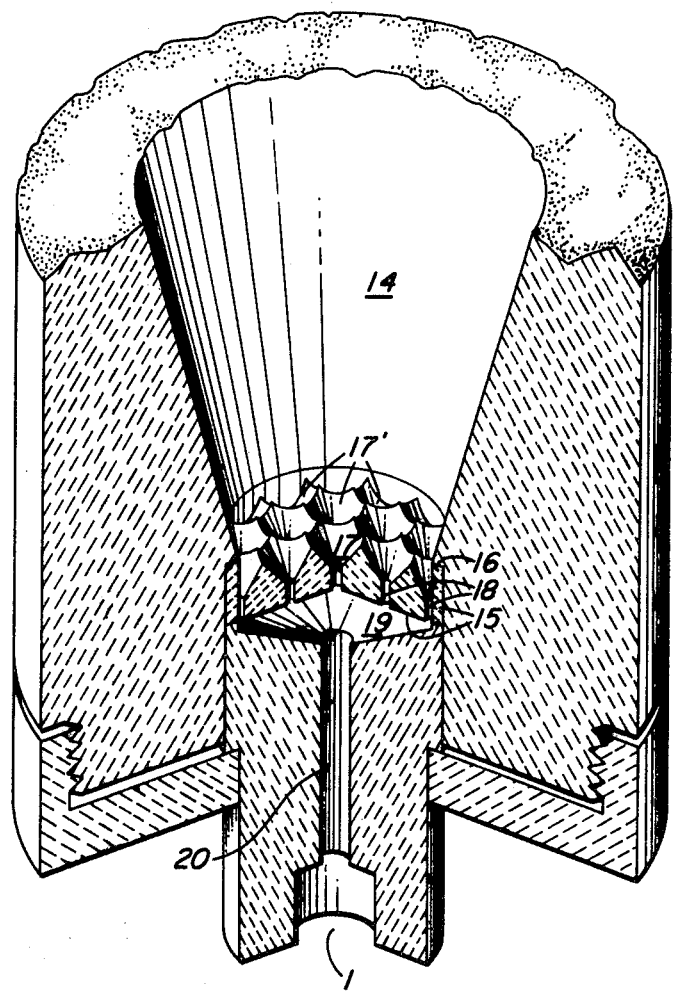
FIG. 2 is a sectional isometric view of the novel gas distributor described herein.

A preferred and novel gas distributor is shown in FIG. 2 in the manner that it is incorporated into the fluidized bed coater. The gas distributor comprises a flat apertured disk 15 fitted flush 16 at its periphery into the tapered section 14 of the fluidized bed coating zone 3 (see FIG. 1). The face plate of disk 15 is covered with a plurality of intersecting conical apertures, 17, 17' such that no flat surface remains on any portion of the faceplate exposed to the fluidized bed coating zone. Although the included angle of the intersecting cones 17, 17' may vary over a rather wide range, e.g., about 45° to 75°, an angle of 60° has been found to give excellent results. Means 18 are provided for connecting these conical apertures 17, 17' to a simple gas plenum 19 which is connected in turn by passageway 20 to gas inlet 1. The distribution of gas flowing through apertures 17, 17' is not known; however, it is reasonable to believe that a slightly higher proportion of the gas passes through aperture 17 than through any other individual aperture 17'. The diameter of disk 15 is not critical to the practice of this invention, nor is the number of conical apertures 17, 17' in the faceplate or the size of the passageway 18 connecting the apertures 17, 17' to the gas plenum 19, so long as the flow of coating gas through apertures 17, 17' is maintained at a proper fluidizing velocity. However, a disk having a 1¼-inch diameter exposed to the fluidized bed coating zone, with nineteen 1/16-inch passageways 18 uniformly spaced, and intersecting cones 17, 17' having internal angles of 60° gave excellent results, when used with a coater having a main coating chamber 13 (see FIG. 1) 3 inches in diameter and a tapered section 14 having an included angle of 30°.

In carrying out the operation of this invention, the fluidized bed coating zone is first brought up to a temperature slightly in excess of the desired coating temperature. While a flow of an inert gas sufficient to fluidize the particle charge is maintained through the coater, solid particles, such as uranium dicarbide, are charged into the fluidized bed coating zone until a charge with an initial surface area of up to about 44,000 cm.$^2$ is attained. The size of individual particles in a charge is limited only by the convenience with which they can be fluidized. However, it has been found that particles in the size range of 100 to 500 microns are particularly suited for coating in fluidized bed operations. When the particles in the bed have achieved the desired temperature, the coating operation is initiated by mixing a gaseous hydrocarbon with the inert gas flowing into the coater. The introduction of the hydrocarbon gas into the coater may change the temperature by 2 or 3 percent. Although the coating temperature can in principle vary over a rather wide range in so long as the cracking or decomposition temperature of the hydrocarbon gas used as a source of carbon is exceeded, it has been found in practice that pyrolytic carbon coatings having desired characteristics as fuel particle coatings can be deposited quite readily in the temperature range of 1,150° to 1,300° C. The properties of the pyrolytic carbon coating deposited depend on the amount and type of gaseous hydrocarbon flowing through the coating zone, the contact time, the surface area of the fluidized bed, and the temperature.

Although the apparatus of this invention has heretofore been operated at constant flow rates of the coating gas, the gas flow rate is not critical to the practice of this invention except as it may ultimately affect the desired properties of the pyrolytic carbon coating being deposited. In certain circumstances, it may be preferable to operate the coater at one gas flow rate until a certain thickness of pyrolytic carbon has been deposited and then to increase the flow somewhat. Assuming, however, a constant rate of input of hydrocarbon to a fluidized bed with a fixed inventory of particles, there will be a decrease in the radial deposition or coating rate during the course of a run.

The manner in which the apparatus of this invention can be used to deposit uniform coatings of high-density, oriented pyrolytic carbon with a smooth microstructure on near kilogram quantities of nuclear fuel particles is illustrated by the following example:

A fluidized bed coater was constructed as follows: A main coating chamber 3 inches in diameter and a fluidized bed coating zone 9⅝ inches in height were provided. The lower tapered section of the fluidized bed coating zone had an included angle of 30° and an opening 1.4 inches in diameter at its lower end. The conical section which made up the particle disentrainment zone was about 2¼ inches in height and had an included angle of 60°. The opening to this section from the main coating chamber was 2 inches in diameter, thus creating a ½-inch lip around the exit from the main coating chamber. The chimney of the coater was 4¾ inches in diameter. Suspended within it at the exit from the particle disentrainment zone was a 3½-inch-diameter central baffle. A gas distributor having an apertured faceplate as hereinbefore described was sealably affixed to the lower tapered section of the fluidized bed coating zone.

The fluidized bed coating zone was heated to 1,225° C. and a flow of helium sufficient to fluidize the bed begun through the coater. A charge of uranium dicarbide fuel particles which had previously been coated with pyrolytic carbon in a conventional fluidized bed coater was then introduced into the fluidized bed coating zone. The charge had an initial surface area of 44,000 cm.$^2$. The weight of the charge was 705 grams, which included 575 grams of uranium. The particles had an average size of 150 microns.

After the fluidized bed had been allowed to come to temperature, methane gas was introduced with the helium and the gas mixture adjusted to a 50 percent concentration by volume of methane. The total input flow of the gas mixture was then adjusted to 30 l./min. The coater was operated at the ambient pressure of Los Alamos, N.M., which is about 580 torr. Under coating conditions, i.e., a 30l./min. flow of a 50/50 gas mixture of helium and methane, the temperature within the fluidized bed varied between about 1,170° and 1,180° C. depending on the region within the fluidized bed. Under these conditions, 28 microns of high-density, oriented pyrolytic carbon having a smooth microstructure were deposited on the fuel particles at an average rate of 3 microns per hour. The density of this oriented pyrolytic carbon coating was 2.07 g./cm.$^3$ and the Bacon anisotropy factor (BAF) was greater than 20 as deposited. The coating thus applied was found on analysis to be uniform in both thickness and properties.

It will be apparent to one of reasonable skill in the art that what has been disclosed is a fluidized bed coater having a novel gas distributor and a novel baffle system in which uniform coatings of high-density, oriented pyrolytic carbon having a smooth microstructure can be deposited on near kilogram quantities of nuclear fuel particles in a single run. Further, it will be appreciated that the utility of such coater is not limited to the deposition of high-density, oriented pyrolytic carbon having a smooth microstructure, but that such coater may readily be used to deposit pyrolytic carbon coatings having widely varying properties. Finally, it will be appreciated that the size of a fluidized bed coater of the type disclosed herein is not limited to that shown by example but can in principle be much larger.

What we claim is:

1. In a fluidized bed coater having, in combination in vertical sequence beginning at the bottom, a gas inlet, a gas distributor, a fluidized bed coating chamber, a particle disentrainment chamber, means for uniformly heating such chambers, a chimney, and a gas outlet, the improvements consisting of:
   a. a gas distributor having a flat apertured faceplate covered with a plurality of intersecting conical apertures such that no flat surface remains on that part of the faceplate exposed to the fluidized bed, means of connecting said intersecting conical apertures to a gas plenum, and means of connecting said plenum to a gas supply; and
   b. a baffle system comprising a wall baffle at the exit from the coating chamber and a central baffle at the exit from the particle disentrainment chamber whereby particles to be coated are kept within a uniformly heated coating zone.

2. The device of claim 1 in which the intersecting conical apertures on the faceplate of the gas distributor have an included angle of 60°.

* * * * *